United States Patent [19]

May

[11] Patent Number: 4,881,326

[45] Date of Patent: Nov. 21, 1989

[54] STERILIZING DEVICE FOR A FREEZE-DRYING APPARATUS

[75] Inventor: Heinz May, Pulheim, Fed. Rep. of Germany

[73] Assignee: Leybold Aktiengesellschaft, Cologne, Fed. Rep. of Germany

[21] Appl. No.: 156,002

[22] Filed: Feb. 16, 1988

[30] Foreign Application Priority Data

Feb. 13, 1987 [EP] European Pat. Off. .... EP87102062.4

[51] Int. Cl.[4] .......................... F26B 13/30; B25J 1/00

[52] U.S. Cl. .......................................... 34/92; 34/242; 414/8; 422/26

[58] Field of Search ................... 34/92, 5, 242; 414/8; 422/26, 28; 53/101

[56] References Cited

U.S. PATENT DOCUMENTS 3,448,556 6/1969 Taggart ............................ 34/92 X 3,451,189 6/1969 Taggart ............................ 34/92 X

FOREIGN PATENT DOCUMENTS 2556467 6/1977 Fed. Rep. of Germany ........ 422/26

*Primary Examiner*—William E. Wayner

*Attorney, Agent, or Firm*—Spencer & Frank

[57] ABSTRACT

A freeze-drying apparatus includes a freeze-drying chamber; a plurality of horizontally oriented, vertically superposed and vertically displaceable shelf plates for supporting thereon receptacles containing the product to be freeze-dried; a plate shifting rod projecting into the freeze-drying chamber and being operatively connected to the shelf plates; and a drive situated externally of the freeze-drying chamber and being connected to the plate shifting rod for moving the plate shifting rod in directions into and out of the freeze-drying chamber. There is provided a sterilizing device including a sterilizing chamber adjoining the freeze-drying chamber and accommodating that length portion of the plate shifting rod which is to be introduced into the freeze-drying chamber during the plate shifting operation.

7 Claims, 2 Drawing Sheets

STERILIZING DEVICE FOR A FREEZE-DRYING APPARATUS

BACKGROUND OF THE INVENTION

This invention relates to an apparatus for freeze-drying products contained in receptacles such as bottles, vials, and the like. The apparatus is of the type which has a chamber, a plurality of vertically shiftable shelf plates and at least one plate shifting rod by means of which the shelf plates are moved. The plate shifting rod-actuating device is arranged externally of the chamber.

Freeze-drying processes are utilized mainly for preserving temperature sensitive products in order to retain their properties unchanged. The principal fields where freeze-drying is practiced are pharmacy, biology and medicine.

The conventional freeze-drying process has generally the following steps: during a first phase the water-containing product is frozen, for example, at a shelf plate temperature of $-40°$ C. Thereafter, a sublimation of the water—present in ice form—is effected under vacuum, approximately at a pressure of $10^{-1}$ mbar. After such a principal drying a postdrying is performed to achieve an extremely low residual water content. During the post-drying the product is warmed to the extent possible. The pressure at which the postdrying takes place is at approximately $10^{-3}$ mbar.

Apparatus for performing freeze-drying of the above-outlined type are known and are described, for example, in U.S. Pat. Nos. 3,448,556 and 3,451,189. These prior art arrangements relate to large freeze-drying installations where the product (such as vaccination substances, enzymes, vitamins, hormones, viruses, and the like) to be lyophilized is in a plurality of small containers. For performing the freeze-drying process, the containers are positioned on height-variable shelf plates. Each container is provided on its top with a special closure plug which, during the course of the freeze-drying process presents only a slight resistance to the outflow of water vapors. Upon conclusion of the freeze-drying process, the shelf plates are pushed together with the aid of a plate shifting rod which is introduced into the chamber. In this manner, the plugs are pressed into the openings of the respective containers for sealing the same. The chamber is opened and the freeze-dried products are removed only after the containers are hermetically closed as described.

During the above-described freeze-drying process particularly stringent requirements are set for environmental sterility. For this reason it is conventional to sterilize the entire installation (the freeze-drying chamber, the condenser and other components) either before introducing every new charge of product to be lyophilized or at desired intervals. For this purpose, for example, saturated vapor with a predetermined pressure is introduced into the previously evacuated installation. The sterilizing temperature is conventionally approximately 125° C. which corresponds to a pressure of approximately 2.3 bar. After a period of approximately 25 minutes the vapor is released, while a slight residual pressure is maintained in the chamber. Thereafter, the chamber and the condenser are dried by evacuation with a liquid seal pump at a pressure of approximately 50 mbar, and the shelf plate system is re-cooled to the charging temperature.

The freeze-drying chamber is charged with the receptacles which contain the product to be lyophilized only after the above-described sterilizing process has been performed. The containers themselves have been previously subjected to a sterilizing process. Furthermore, the charging process itself is performed from a sterile space.

If, in the freeze-drying processes described in the above-identified United States patents, during the charging process or at he end of the freeze-drying process the plate shifting rod is introduced into the chamber in order to alter the height of the shelf plates or to push the containers towards one another, a non-sterile portion of the plate shifting rod gains access to the chamber which, upon conclusion of the freeze-drying process, may still be under a pressure of approximately $10^{-3}$ mbar. During such a period the risks are high that an undesired contamination of the product occurs.

SUMMARY OF THE INVENTION

It is an object of the invention to provide an improved arrangement for eliminating the earlier-discussed risks of contamination during dry-freezing processes.

This object and others to become apparent as the specification progresses, are accomplished by the invention, according to which, briefly stated, a sterilizing chamber is provided which is associated with that length portion of the plate shifting rod which is to be introduced into the freeze-drying chamber.

The invention thus provides that a sterilizing process is performed in the sterilizing chamber while the plate shifting rod portion—which is to be advanced into the freeze-drying chamber—dwells therein. The sterilizing process takes place prior to the freeze-drying process proper or at another point in time, for example, during the "freezing" phase of the process. As a result, upon conclusion of the freeze-drying process the plate shifting rod length portion introduced into the freeze-drying chamber will be sterile and thus the risks of undesired contamination during the shelf plate height variation is effectively eliminated.

DESCRIPTION OF THE PREFERRED EMBODIMENT

Figure 1:
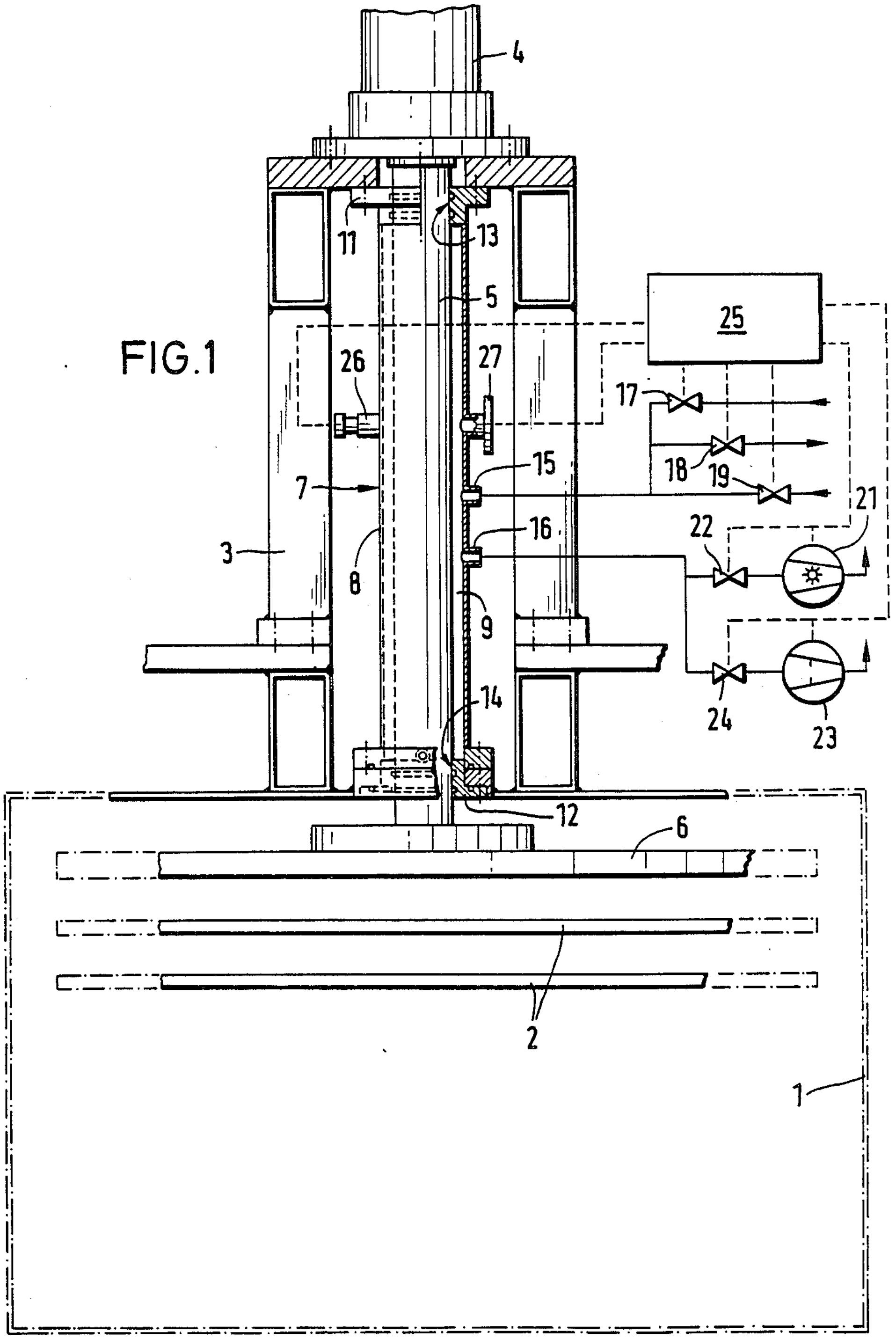
FIG. 1 is a schematic sectional elevational view, with block diagram, of a preferred embodiment of the invention.

Turning to FIG. 1, there is symbolically illustrated a freeze-drying chamber 1 and height-adjustable shelf plates 2 accommodated therein. The conventional condenser is not shown. On the freeze-drying chamber 1 there is supported, by means of a steel frame 3, a power cylinder unit (closing unit) 4 which is only partially shown. The piston (not visible) of the power unit 4 is coupled with a plate shifting rod 5 whose outer terminal length portion projects from above into the freeze-drying chamber 1 and carries there a pressure plate 6. By lowering the plate shifting rod 5 as a result of appropriate actuation of the power cylinder unit 4 the shelf plates 2 are pushed together. Such a step constitutes, for example, the conclusion of a freeze-drying process of products which are accommodated in containers (such as bottles or vials) having special plug closures at their top. By virtue of pushing together the shelf plates 2, the plugs are pressed into the respective receptacle thus effecting a closing thereof. In this manner, a closing of the containers under vacuum or in an atmosphere of an inert gas is feasible.

In order to eliminate any risk of contamination of the freeze-drying chamber and the products disposed therein by the surface of that end portion of the plate shifting rod 5 which moves from the outside into the freeze-drying chamber 1, according to the invention a separate sterilizing device generally designated at 7 is provided. The sterilizing device 7 comprises a cylindrical tube 8 which surrounds the plate shifting rod 5 and defines an annular sterilizing chamber 9 therewith. The axial ends of the annular chamber 9 are closed off by respective flanges 11 and 12 which are sealed relative to the plate shifting rod 5 by respective dual seals 13, 14. The distance of the sealing assembly 11, 13 situated adjacent the power unit 4 from the sealing assembly 12, 14 situated at the freeze-drying chamber 1 is so selected that the maximum length portion of the plate shifting rod 5 that may conceivably be introduced into the freeze-drying chamber 1 can be accommodated in the sterilizing chamber 9.

The cylindrical tube 8 is provided with two coupling ports 15 and 16 which are connected to devices for carrying out the sterilization process. Through port 15 vapor is introduced from a valve 17 and vapor is withdrawn through a valve 18 and also, sterile air or sterile inert gas is introduced from a valve 19. The port 16 is connected to a liquid seal pump 21 via a valve 22 and a rotary vane pump 23 via a valve 24.

A control device 25 is provided for automatically performing the sterilizing process. The control device 25 is connected with a temperature sensor 26 and a pressure sensor 27 which are both connected to the cylindrical tube 8 and which transmit electric signals representing the temperature and pressure inside the annular chamber 9. As a function of the electric signals and the desired working period for the vapor, the earlier-outlined sterilizing process is conducted in an automatic manner. Such a sterilizing process may be performed at any desired time, that is, independently from or simultaneously with the sterilizing process of other components of the freeze-drying installation. Expediently, all devices which are necessary for sterilizing the plate shifting rod 5 and the freeze-drying apparatus proper are constituted by one and the same sterilizing arrangement provided with appropriate controls.

Figure 2:
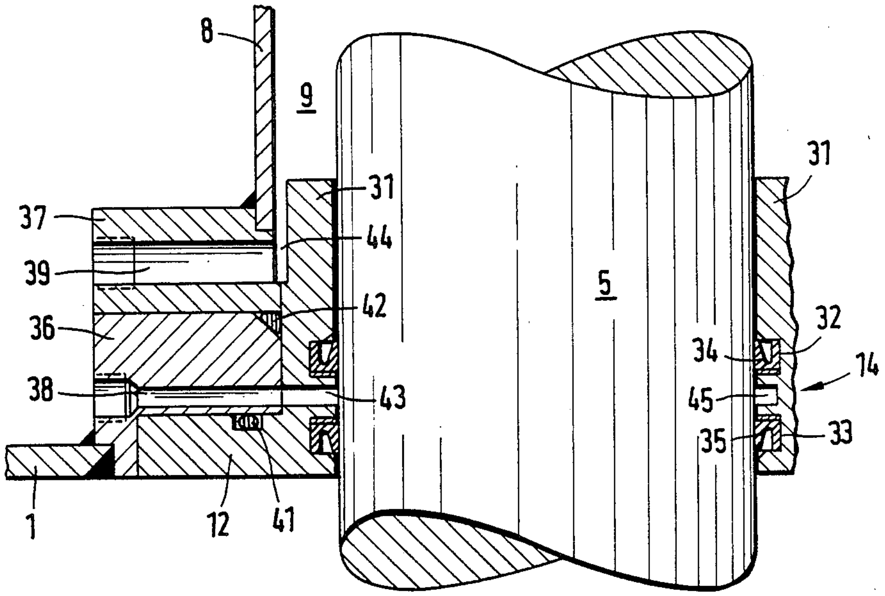
FIG. 2 is an enlarged sectional elevational detail of FIG. 1.

Turning to FIG. 2, there is illustrated therein that terminal part of the annular chamber 9 which is adjacent the freeze-drying chamber 1. The inner wall of the flange 12 provided with a sleeve-like guide 31 for the plate shifting rod 5 contains annular grooves 32 and 33 receiving sealing rings 34 and 35 which constitute the dual seal 14. In this manner the chamber 9 is securely sealed from the freeze-drying chamber 1.

The sleeve-like part 31 of the flange 12 is surrounded by two annular fittings 36 and 37 having radial bores 38 and 39. The fitting 36 is welded to the wall of the freeze-drying chamber 1 and is sealed with respect to the flange 12 and the fitting 37 by means of sealing rings 41 and 42. The radial bore 38 is in axial alignment with a radial bore 43 provided in the flange 12, whereby a channel is provided through which the plate shifting rod length portion situated between the sealing rings 32 and 33 is accessible. The bore 43 opens into an annular channel 45 which surrounds the plate shifting rod 5. By virtue of this arrangement, during the course of the sterilizing process, it is feasible to introduce hot vapors into this zone of the seal, so that in the zone of the dual seal 14 too, an effective sterilization is obtained. This process step may be omitted in case the plate shifting rod 5 is, during the sterilization process, displaced by a back-and-forth movement, through a distance which corresponds to the axial height of the sealing assembly 12, 14.

The fitting 37 is welded to the cylindrical tube 8 and forms with the sleeve-like guide component 31 of the flange 12 an annular chamber 44 which connects the radial bore 39 with the sterilizing chamber 9. During the course of the sterilization process the condensate is removed through the annular chamber 44 and the channel 39.

In the embodiment illustrated in FIGS. 1 and 2 the plate shifting rod is situated above the freeze-drying chamber 1. It is therefore expedient to provide for a thorough sterilization of the seal 12, 14 by measures illustrated in FIG. 2 and also, to remove the condensate also from this zone. If the plate shifting rod 5 is, in a manner known by itself, introduced into the freeze-drying chamber 1 from below, then measures have to be provided for the removal of the condensate in the zone of the lower seal, that is, in the zone of the seal provided adjacent the power cylinder unit.

The present disclosure relates to subject matter contained in European Patent Application No. 87102062.4 (filed Feb. 13th, 1987) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a freeze-drying apparatus including a freeze-drying chamber; a plurality of generally horizontally oriented, vertically spaced and generally vertically displaceable shelf plates for supporting thereon receptacles containing the product to be freeze-dried; a plate shifting rod projecting into the freeze-drying chamber and being operatively connected to said shelf plates; drive means situated externally of said freeze-drying chamber and being connected to said plate shifting rod for moving the plate shifting rod in directions into and out of said freeze-drying chamber; said plate shifting rod having a first position in which a length portion of said plate shifting rod is situated externally of said freeze-drying chamber and a second position in which said length portion is situated within said freeze-drying chamber; the improvement comprising a sterilization device including means defining a sterilizing chamber having opposite longitudinal ends; said sterilizing chamber adjoining said freeze-drying chamber and accommodating said length portion in the first position of said plate shifting rod; flanges surrounding said plate shifting rod and being mounted on said means at opposite longitudinal ends of said sterilizing chamber for closing off said sterilizing chamber; and a seal assembly mounted in each flange for effecting a seal between the plate shifting rod and a respective said seal assembly; the seal assembly mounted in at least one of said flanges including two sealing rings; said one flange having an inner face oriented towards said plate shifting rod; further comprising two spaced circumferential grooves in said inner face for receiving respective said sealing rings and a throughgoing radial bore provided in said one flange between said two circumferential grooves.

2. A freeze-drying apparatus as defined in claim 1, wherein said means defining said sterilizing chamber includes a cylindrical tube surrounding said plate shifting rod and forming therewith an annular chamber; said tube having ports for maintaining communication between said annular chamber and components of said sterilizing device.

3. A freeze-drying apparatus as defined in claim 1, wherein said sterilizing device comprises a pressure sensor mounted on said means defining said sterilizing chamber; said pressure sensor being arranged for sensing pressures prevailing in said sterilizing chamber.

4. A freeze-drying apparatus as defined in claim 1, wherein said sterilizing device comprises a temperature sensor mounted on said means defining said sterilizing chamber; said temperature sensor being arranged for sensing temperatures prevailing in said sterilizing chamber.

5. A freeze-drying apparatus as defined in claim 1, wherein one of said flanges adjoins said freeze-drying chamber; further comprising a tubular guide forming part of said one flange; said tubular guide slidingly surrounding said plate shifting rod.

6. A freeze-drying apparatus as defined in claim 1, wherein the flanges are situated at different height levels, further wherein one of said ports adjoins the flange situated at the lower height level.

7. A freeze-drying apparatus as defined in claim 1 further comprising an annular channel provided in said one flange between said circumferential grooves; said bore communicating with said annular channel.

* * * * *